United States Patent [19]

Roddy

[11] 4,110,644
[45] Aug. 29, 1978

[54] DYNAMOELECTRIC MACHINE END SHIELD ARRANGEMENT

[75] Inventor: Joseph T. Roddy, Ballwin, Mo.

[73] Assignee: Emerson Electric Co., St. Louis, Mo.

[21] Appl. No.: 710,604

[22] Filed: Aug. 2, 1976

[51] Int. Cl.² ............................................. H02K 5/00
[52] U.S. Cl. ...................................... 310/91; 310/42; 310/89; 310/258
[58] Field of Search .................. 310/42, 90, 91, 89, 310/254, 258, 43

[56] References Cited

U.S. PATENT DOCUMENTS

| | | | |
|---|---|---|---|
| 3,300,666 | 1/1967 | Frazier | 310/42 |
| 3,343,013 | 9/1967 | Wightman | 310/43 |
| 3,378,709 | 4/1968 | Royer | 310/90 |
| 3,437,853 | 4/1969 | Arnold | 310/42 |
| 3,489,934 | 1/1970 | Lewis | 310/43 |
| 3,714,705 | 2/1973 | Lewis | 310/90 |
| 3,935,489 | 1/1976 | Church | 310/90 |

*Primary Examiner*—R. Skudy
*Attorney, Agent, or Firm*—Polster, Polster and Lucchesi

[57] ABSTRACT

An electric motor having a laminated stator core, a pair of formed end shields cemented to the stator core, and a rotor journaled in the end shields is provided with mounting tabs for the end shield pair that mate or intermesh with one another when positioned properly with respect to the stator core. Pairs of oppositely opposed mounting tabs, in their intermeshed position, define an opening through the tabs from the exterior to the interior surface of the tabs. An adhesive injected through the opening defined by the tabs spreads smoothly between the stator core and the interface of the tabs, and between the oppositely opposed ends of the tabs.

11 Claims, 6 Drawing Figures

DYNAMOELECTRIC MACHINE END SHIELD ARRANGEMENT

BACKGROUND OF THE INVENTION

This invention relates to dynamoelectric machines having end shields which support bearings for a rotor. While the invention is described with particular application in regard to induction motors, those skilled in the art will recognize the wider applicability of the inventive features disclosed herein.

Modern adhesives, such as epoxy resins, are widely used for cementing the end shields of electric motors to some part of a stator assembly for the motor. The motor is assembled with thin removable shims between the rotor and the stator core, and thereafter an adhesive between the stator core and the end shields is applied and allowed to set. When the adhesive is set, the shims are removed through openings in the end shields.

An early problem encountered in cementing end shields to stator cores involved in the placement of the adhesive so that it did an efficient job in holding the end shields to the stator core. Some of the problems involved, and the solution to the adhesive placement problem, are discussed in the United States Patent to Lewis, U.S. Pat. No. 3,489,934, and references cited therein. Aspects of the Lewis patent, U.S. Pat. No. 3,489,934, not disclosed herein are intended to be incorporated by reference. Lewis proposed an axially extending tab having an opening drilled in it. The radially inner face of the tab also had a slot milled transversely of the tab, edge to edge, which passed through the axial position of the drilled hole. The hole or opening permits the application of adhesive to the radially inward surface of the mounting tab, so that a firm bond between the tab and stator core exists.

In Lewis, two oppositely opposed end shields are used with a single stator core. Each end shield has four mounting tabs associated with it. Consequently, eight drilled openings and eight milled slots are made for each motor using adhesively attached end shields. The expense required in machining the openings and slots is relatively high, and considerable cost savings can be effected if the machining operations are eliminated, provided that the benefits that are derived from the Lewis patent are maintained. The invention disclosed hereinafter accomplishes this result.

One of the objects of this invention is to provide a dynamoelectric machine having end shields and a stator held together by an adhesive in which the adhesive is more efficiently utilized and more predictably applied than in other prior art motors of cemented construction.

Another object of this invention is to provide an end shield for a dynamoelectric machine that permits the application of adhesive to the radially innermost surface of the mounting tab for the end shield, but does not require a machining operation to provide an opening through the mounting tab.

Another object of this invention is to provide mounting tabs for the end shields of a dynamoelectric machine which interlock or intermesh with one another in their mounted position.

Other objects will be apparent to those skilled in the art in light of the following description and accompanying drawings.

SUMMARY OF THE INVENTION

In accordance with this invention, generally stated, a dynamoelectric machine is provided with end shields having axially projecting mounting tabs. The tabs are designed to intermesh with one another when attached to a stator assembly of the dynamoelectric machine. When intermeshed, the tabs define a hole extending to a radial inner face of the tabs. The intermeshed tabs are bonded to a stator part by an adhesive injected between the tabs and the stator core through the hole defined by the tab pair. The construction disclosed also gives an improved adhesive bond between oppositely opposed pairs of the mounting tabs, in addition to the bond between respective ones of the tabs and the stator core.

DESCRIPTION OF THE PREFERRED EMBODIMENT

Figure 1:
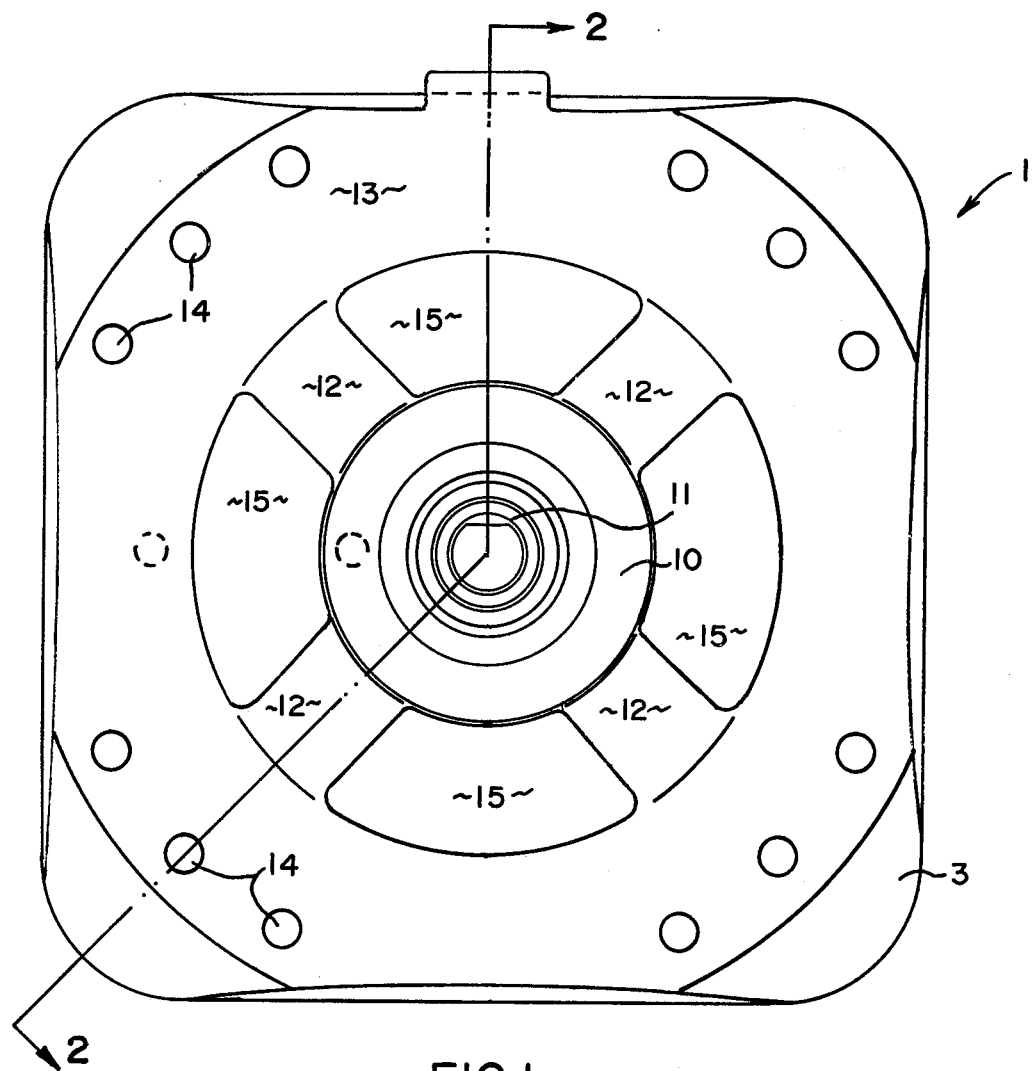
FIG. 1 is an end view of a dynamoelectric machine employing one illustrative embodiment of end shield of this invention.

Referring now to the drawings, reference numeral 1 indicates an AC induction motor including a pair of end shields 3, only one of which is shown in the drawings, the non-illustrated end shield being similar to that shown, a stator assembly 2 and a rotor assembly 4.

The stator assembly 2 includes a stator core 21 made up of a multiplicity of identical laminations 22. The laminations are secured face-to-face in axial alignment to define an axial rotor bore 23 surrounded by stator teeth 24, around which coils 25 are wound.

The rotor assembly 4 includes a motor shaft 41, extending through the end shield 3 pair on at least one end of the motor 1. The shaft 41 is journaled in bearings 61 mounted in each of the end shields 3.

The laminations 22 generally are rectangular in plan, and each of the laminations has a plurality of channels 26 formed in it. The channels 26 conventionally are formed along the far corners of the laminations 22. The channels 26, in turn, may have a cleat notch 27 formed in them. The cleat notch 27 receives a cleat for clamping the individual laminations 22 in their aligned relationship to form the stator core 21. The core 21 construction is conventional, the details just described being best observed in FIG. 6. Those skilled in the art will recognize that the construction and structural features of stator assembly 2, rotor assembly 4 and laminations 22 may vary in other embodiments of this invention.

Each of the end shields 3 include a hub 10 having a central opening 11 through it. Bearing 61 is mounted in the hub 10, and the opening 11 permits passage of the shaft 41. The shaft 41 may extend through both of the end shields, or an end shield may have the opening 11 blocked to prevent shaft 41 extension therethrough. The particular end shield 3 shown in FIG. 1 has a relatively broad surface 13 having a plurality of open areas 15 formed in it. The structure between the open areas 15 defines spokes 12 extending radially inwardly to the hub 10. The surface 13 has a generally rectangular silhouette in the particular embodiment shown, and each of the four corners of the surface 13 has a mounting tab 50 integrally formed with it. Surface 13 also has a plurality of openings 14 formed in it. The openings 14 are utilized for various conventional purposes, not here pertinent. Open areas 15 too are conventional, providing ventilating openings in the end shield for the motor 1. The open areas 15 also provide access to the shims, not shown, used during motor construction.

The particular end shield shown in the drawings is a die cast part constructed from aluminum. Various struts 62 may be provided to strengthen the end shield design structurally, if desired.

Figure 3:
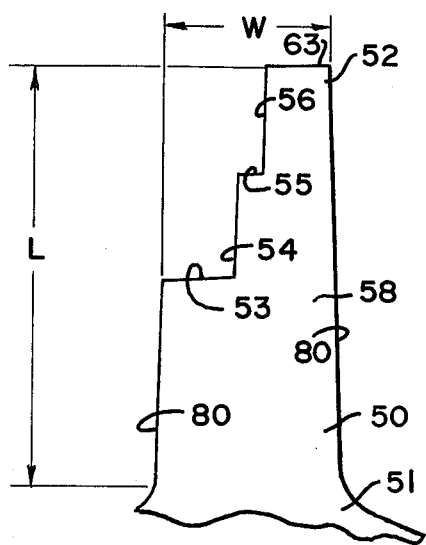
FIG. 3 is a top plan view, partly broken away, of one illustrative embodiment of mounting tab used in conjunction with the end shield shown in FIG. 1.
Figure 2:
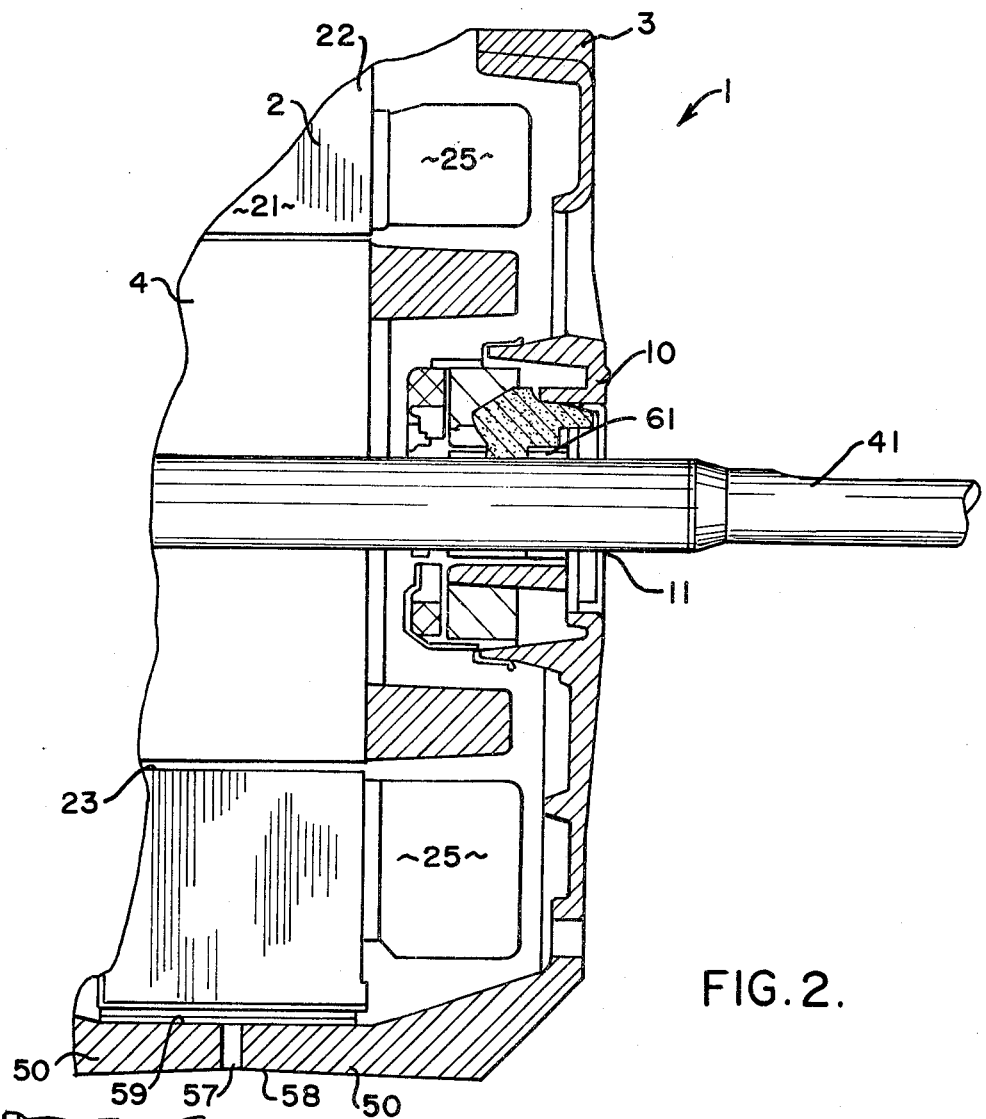
FIG. 2 is a sectional view, partly broken away, taken along the line 2—2 of FIG. 1.
Figure 4:
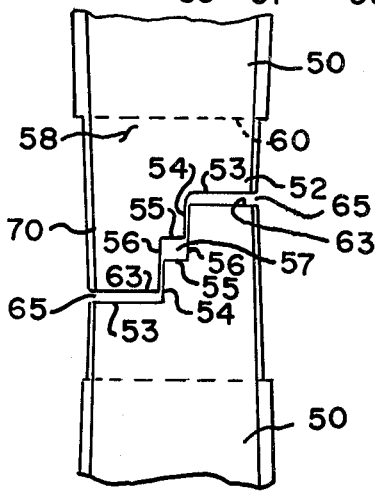
FIG. 4 is a top plan view, partly broken away, illustrating the intermounted position for a pair of oppositely opposed mounting tabs for the motor shown in FIG. 1.

Referring now to FIGS. 2 and 4, it may be observed that the mounting tabs 50 extends axially with respect to the centerline axis of the motor shaft 41. Each of tabs 50 has an end 51 attached to the surface 13, and a free end 52. As illustrated in FIG. 3, tab 50 has a width dimension W and a length dimension L, the length dimension having a stepped construction. That is to say, an edge 53 extends inwardly of a perimeter 80 for a predetermined distance. The edge 53, in turn, is followed by an axially extending surface 54 for a predetermined distance. The surface 54 then is followed by an edge 55 extending laterally of the surface 54. Edge 55, in turn, is followed by a surface 56, generally parallel to the surface 54, but displaced therefrom by the length of the edge 55. This relationship is important, as later discussed in detail. Finally, the end 52 terminates in an edge 63. The length L of each of the tabs 50 is chosen so that it will encompass at least a part of the stator core 21 and interlock or mate with the tab 50 of the oppositely opposed end shield. The tabs 50 also have a side 66 and a side 67 along the material thickness of the tabs.

Figure 5:
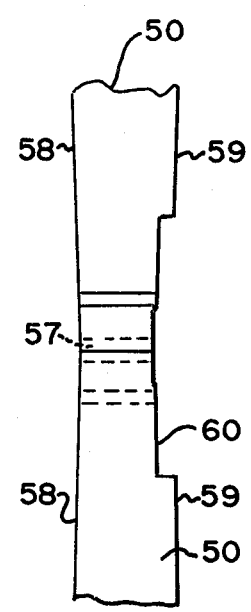
FIG. 5 is a view in side elevation, partly broken away, of the mounting tabs shown in FIG. 4.

The interlocking relationship of the tabs 50 is best observed in FIG. 4. As there shown, when intermeshed the surfaces 54 and 56 and the edges 55 of the oppositely opposed tabs 50 define an aperture or opening 57. The opening 57 extends from an upper surface or face 58 of the tabs 50, to a lower surface or face 59 of the tabs. The surface 59 of the tabs 50 is constructed so that it has a groove 60 formed in it, which is best seen in FIG. 5. The groove 60 is important in ensuring attachment of the end shields to the stator core 21.

The surface areas 54 and 56 of the oppositely opposed tabs 50 are constructed so that they abut or nearly abut one another, with little clearance. This is an important feature of the invention in that application of an adhesive 68 from the surface 58 side of the tabs 50 necessarily causes the adhesive to flow through the opening 57 defined by the tabs to the surface side 59 of the tabs and into the groove 60. Without the close fit between the surface areas 54 and 56, the adhesive would tend to flow outwardly between the oppositely opposed tabs, at best requiring an excessive amount of adhesive, and at worst leaving a weak bond between the tabs 50 and the stator core 21.

The edge 63 of one end 52 of the tabs 50 defines a slot 65 with the edge 53 of the oppositely opposed one of the tabs 50. The slot 65 is considerably larger than the close fit between respective ones of the surfaces 54 and 56, discussed above. Slot 65 permits axial adjustment of the rotor and stator assemblies with respect to one another, as, for example, with the use of thrust washers along the ends of the shaft 41, to position the rotor properly with respect to the stator core 21. This end play or adjustment feature is a practical consideration of motor construction, and the width of the slot 65 may vary in any particular class of dynamoelectric machines with which this invention finds application. The variation, however, does not materially affect the close fit of the surface areas 54 and 56.

The slot 65 enables adhesive to flow from the surface 59 side of the tabs 50 up through the slot 65, thereby increasing the area of adhesive contact between the oppositely opposed tabs 50. Consequently, motors constructed in accordance with the inventive principles of this invention have an adhesive bond between the tabs of the respective end shields. Since the end shields themselves are locked adhesively with respect to one another, the structural strength of the overall motor construction is believed to be enhanced. In one strength test, motors constructed in accordance with this invention exhibited twice the pull strength of motors constructed in accordance with prior art teachings for the same amount of epoxy adhesive. Pull strength is defined to mean the amount of force applied to an end shield tending to break the bond between the end shield and the stator assembly 2.

Figure 6:
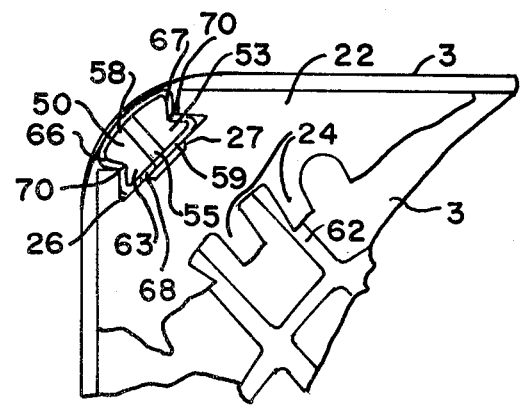
FIG. 6 is a view in end elevation, partly broken away, of the mounting tab of this invention.

The tabs 50 in FIGS. 4 and 6 are illustrated with shallow grooves 70 along their sides 66 and 67, respectively. The grooves 70 are not shown in FIGS. 3 and 5 for drawing simplicity. Grooves 70 are an old expedient for ensuring adhesive contact between the mounting tabs and the stator core 21. Thus, an adhesive, such as a thermo setting epoxy resin, may be injected by any suitable means through the opening 57, defined by the tabs 50, into the groove, 60, and the space between the surface 59 and the laminated stator core 21. The epoxy resin, in general, is a thick, viscous material which flows outwardly from the opening 57, the viscosity of the resin ensuring that it spreads outwardly at least some distance in all directions from the hole or opening 57, contacting a relatively broad surface of the stator core 21 and the tabs 50. The proximity of the groove 60 to the opening 57 ensures that it is filled first. Thereafter, the epoxy tends to reverse its flow direction and move upwardly into the grooves 70 and the slot 65.

In the manufacture of the motor 1, the stator assembly 2, rotor assembly 4 and end shields 3 are assembled in a standard manner to obtain a uniform air gap between the rotor assembly 4 and the stator bore 23 and a concentric fit between the rotor shaft 41 and the end shield bearings 61, such as by shimming the rotor in the stator bore 23. Adhesive then is applied. After a predetermined quantity of the epoxy resin has been injected through each of the openings 57, the epoxy is cured by heating, for example, and the shims are removed.

It thus will be apparent that the various ends and objects set forth hereinabove have been met, while all the advantages described in the U.S. Patent to Lewis are retained. This is accomplished without any drilling or milling operations being performed on the tab structure.

Numerous variations in the end shield assembly structure of this invention, within the scope of the appended claims, will occur to those skilled in the art in light of the foregoing disclosure. For example, the mounting tab on the end shield may be made much smaller or much larger than those of the illustrative embodiment described herein. The particular silhouette of the tabs 50 or the end shield 3 may vary. The important relationship is that the tabs have two parallel surface areas displaced by some lateral distance for defining, in combination with an opposed end shield, the opening 57. Various conventional features of the motor 1 may be varied in other embodiments of this invention. While the end shield is described as a die cast part, other forms of construction may be used. For example, the end shields may be punched from sheet steel, if desired. These variations are merely illustrative.

Having thus described the invention, what is claimed and desired to be secured by Letters Patent is:

1. In a dynamoelectric machine having a laminated stator core, a pair of end shields positioned on opposite ends of said laminated core, and a cementing composition bonding said end shields to said laminated core, the improvement comprising axially projecting mounting tabs connected to said end shields, said mounting tabs being adapted to encompass laminations of said laminated core, said tabs having a first end integrally formed with said end shield, a free second end, and an axial length therebetween, said axial length having a stepped construction including a first surface area, a second surface area, and a lateral edge between said first and said second surface areas, said first and said second surface areas being displaced from one another by a distance equal to the length of said lateral edge, oppositely opposed pairs of tabs of said end shields mating with one another, the lateral edges of said mating tabs lying approximately adjacent one another, said tabs defining an aperture extending through said tab pair to a radially inner face of said tab pair when said end shields are in their mated position, said aperture forming a passageway through the mated tabs.

2. The improvement of claim 1 wherein each of said tabs has a groove formed in it along the inner face of said tab.

3. The improvement of claim 1 wherein the axially extending terminal edge of said tab is spaced from the axially inboard innermost edge of the oppositely opposed tab so as to define a slot therebetween, said slot permitting axial adjustment of the oppositely opposed end shields of said dynamoelectric machine.

4. The improvement of claim 3 wherein each of said tabs has first and second sides along the material thickness of said tab, said sides having a shallow groove formed in them.

5. An end shield system for supporting a rotor assembly and shaft of a dynamoelectric machine, said dynamoelectric machine including a stator assembly, comprising:

a pair of end shields axially aligned but oppositely opposed with respect to one another, said end shields having a central hub portion, said hub portion having an axial opening therethrough for receiving said shaft, and bearing means for permitting rotation of said shaft along said central hub portion; and means for attaching said end shields to the stator assembly of said dynamoelectric machine, said attaching means comprising a plurality of tabs extending axially outwardly from said end shields, said tabs having a first end integrally formed with said end shield, a free second end, and an axial length therebetween, said axial length having a stepped construction including a first surface area, a second surface area, and a lateral edge between said first and said second surface areas, said first and said second surface areas being displaced from one another by a distance approximately equal to the length of said lateral edge, the lateral edges of said tabs lying near one another, said first and said second surfaces being generally parallel but laterally displaced from one another, respective ones of said first and said second surfaces being approximately adjacent second and first surfaces of the oppositely opposed end shields in the rotor assembly supporting position of said end shields.

6. The end shield system of claim 5 wherein each of said tabs has an inner face, said inner face having a groove formed in it.

7. The end shield system of claim 5 wherein the axially extending terminal edge of said tab is spaced from the axially inboard innermost edge of the oppositely opposed tab so as to define a slot therebetween, said slot permitting axial adjustment of said end shield pair.

8. The end shield system of claim 7 wherein each of said tabs has first and second sides along the material thickness of said tab, said sides having a shallow groove formed in them.

9. In a dynamoelectric machine having a stator and a pair of end shields mounted on opposite sides of said stator, the improvement comprising mounting tabs mounted to said end shields, each of said mounting tabs having a first surface area and a second surface area displaced with respect to one another along an offset, oppositely opposed ones of said tabs mating with one another along said first and said second surface areas, oppositely opposed pairs of said tabs defining an aperture along said offset, said aperture extending through said tab pair to a radially inner side of said tab pair in the mated position of said end shields.

10. An end shield system for supporting a rotor assembly of a dynamoelectric machine, said dynamoelectric machine including a stator assembly, comprising:

a pair of end shields axially aligned but oppositely opposed with respect to one another, said end shields having a central hub portion, said hub portion having an axial opening through it for receiving a shaft of said rotor assembly, and bearing means for permitting rotation of said shaft along said central hub portion; and means for attaching said end shields to the stator assembly of said dynamoelectric machine, said attaching means comprising a plurality of tabs extending axially outwardly from said end shields, each of said tabs having an end formed so as to define a first surface and a second surface, said first and said second surfaces being generally parallel but laterally displaced from one another, respective ones of said first and said second surfaces being approximately adjacent second and first surfaces of the oppositely opposed end shields in the rotor assembly supporting position of said end shield system, the lateral displacement of said opposed end shields defining an aperture extending through said tab pair to a radially inner side of said tab pair in the mounting position of said shields.

11. In a dynamoelectric machine having a stator and a pair of end shields mounted on opposite sides of said stator, the improvement comprising mounting tabs attached to said end shields, each of said tabs having an end formed so as to define a first surface area and a second surface area, said first and second surface areas being offset with respect to one another, oppositely opposed ones of said tabs mating with one another along said first and said second surfaces, opposed ones of said tabs defining an aperture extending through said tab pair to a radially inner side of said tab pair in the mated position of said tabs.

* * * * *